United States Patent Office 3,453,151
Patented July 1, 1969

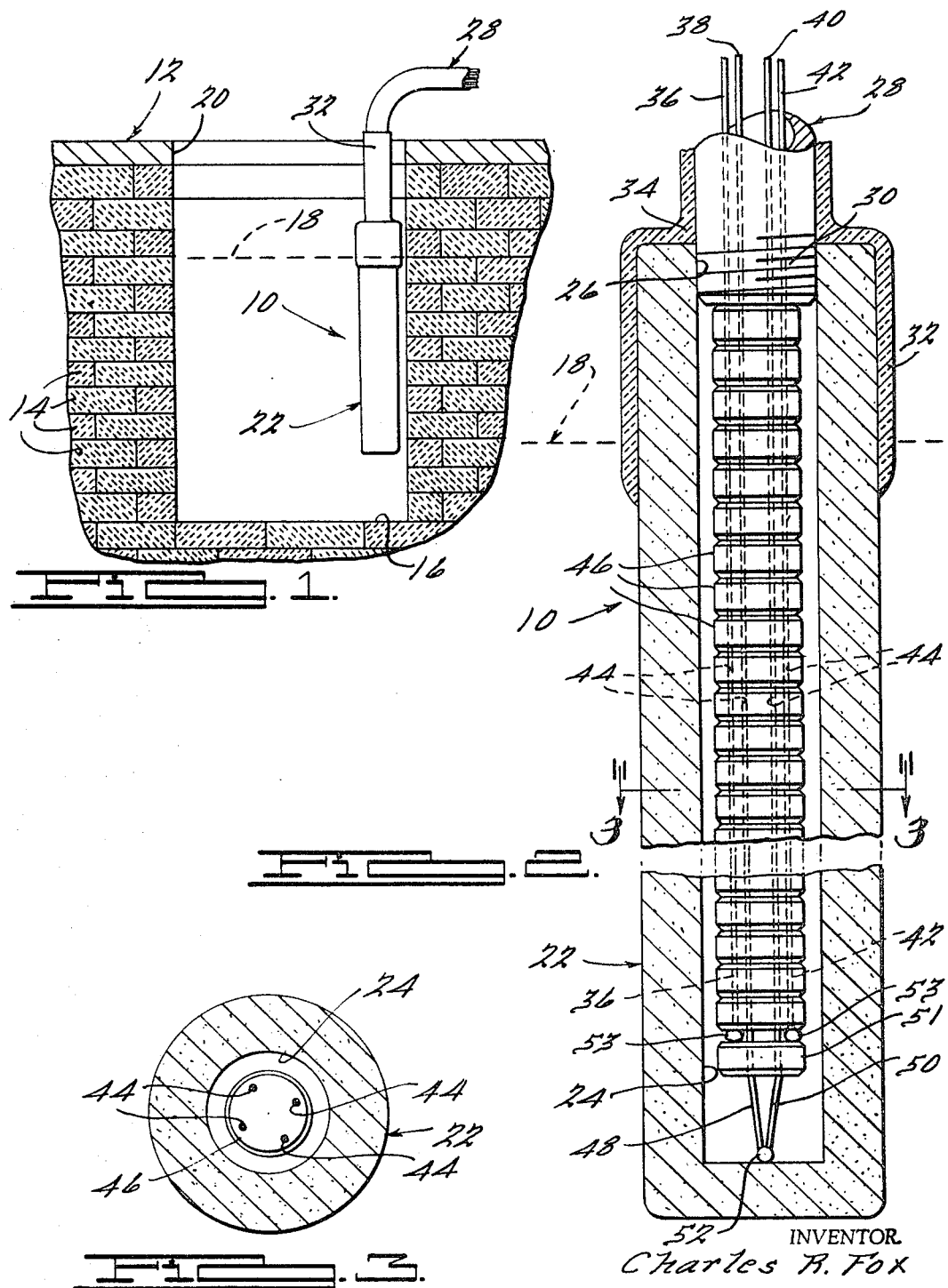

3,453,151
THERMOCOUPLE WITH LEAK DETECTOR
Charles R. Fox, Livonia, Mich., assignor to Park Chemical Company, Detroit, Mich., a corporation of Michigan
Filed Mar. 9, 1965, Ser. No. 438,284
Int. Cl. H01v 1/04
U.S. Cl. 136—232                                                4 Claims

ABSTRACT OF THE DISCLOSURE

In a temperature control device, a hollow elongated cylindical housing defining a central cavity, first conductor means comprising a thermocouple mechanism and communicable with a temperature regulating mechanism, and second conductor means partially coextensive of the first conductor means and terminating at the lower end of the cavity, the second conductor means being communicable with a source of electric current and means for indicating the flow of the current through the second conductor means, whereby the indicating means will be energized when an electrically-conductive substance comes in contact with the second conductor means.

The purpose of the above abstract is to provide a nonlegal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

This invention relates generally to temperature sensing apparatus and, more particularly, to a new and improved temperature control device which is adapted to be operatively associated with electrically heated furnaces and the like.

It is a general object of the present invention to provide a new and improved temperature control device which is adapted to be at least partially submerged in the molten bath of an electrically heated furnace or the like, and function to selectively control energization of the heating elements of the furnace so that the bath is maintained at a preselected temperature level.

It is a more particular object of the present invention to provide a new and improved temperature control device of the above character which is particularly adapted to be used with furnaces which contain highly corrosive or caustic molten baths.

It is still a more particular object of the present invention to provide a new and improved temperature control device of the above character which will find particularly useful application in aluminum brazing furnaces containing molten salt baths.

It is still another object of the present invention to provide a new and improved temperature control device of the above character which includes an external housing and sensing means within the housing for detecting the presence of any of the molten bath which may have leaked into the housing.

It is a further object of the present invention to provide a new and improved temperature control device of the above character which is of a simple design and thus may be easily assembled and economically manufactured.

The foregoing and other related objects and advantages of the present invention are achieved through the provision of a novel temperature control device that comprises a hollow cylindrical housing or protection tube that is preferably constructed of graphite or a similar carbonaceous material and which contains suitable temperature sensing means such as a thermocouple or the like. The housing is adapted to be supported by a tubular support member at a position partially submerged within a molten bath of an electrically heated furnace, for example, the molten salt bath of an aluminum brazing furnace, and have the thermocouple device therewithin connected to the control means for energizing the heating elements of the molten bath. Means are also provided within the housing for detecting the presence of any of the molten bath that may inadvertently leak into the housing, which detecting means is adapted to be connected to a suitable warning device for indicating the presence of a leak opening or similar defect in the housing, as will later be described. The juncture of the graphite housing and the aforementioned support member is covered with an external layer of a glass-like substance which is adapted to provide an air-tight seal around the upper end of the housing and the lower end of the support member and thus prevent the corrosive molten bath from penetrating between these members and deleteriously attacking the temperature sensing means disposed within the interior of the housing.

A more complete understanding of the present invention and other objects and features thereof will be obtained with the following detailed description, taken in conjunction with the accompanying drawing, wherein:

FIGURE 1 is a side elevational view of the temperature control device of the present invention, as shown in operative association with a conventional electrically heated furnace or the like;

FIGURE 2 is a longitudinal cross-sectional view of the temperature control device illustrated in FIGURE 1; and FIGURE 3 is a transverse cross-sectional view taken along the line 3—3 of FIGURE 2.

Referring now to the drawing, a temperature control device 10, in accordance with an exemplary embodiment of the present invention, is shown in operative association with a furnace, generally designated by the numeral 12, which may be constructed of refractory fire brick or the like 14 and defines a bath reservoir 16 within which is located a bath of a molten material, representatively indicated by the numeral 18. The upper end of the furnace 12 defines an access opening 20 through which work stock is transferred to and from the molten bath 18 and within which the temperature control device 10 of the present invention is operatively supported. The molten bath 18 is adapted to be heated by any suitable means such as a heating coil or two or more spaced electrodes which are submerged within the bath and are connected to a suitable source of electric current, such as a power transformer or the like. The temperature control device 10 of the present invention is adapted to be partially submerged within the molten bath 18 and be connected to the on-off control mechanism controlling energization of the aforesaid coil or electrodes, the device 10 thereby being adapted to selectively control the flow of electric current to the coil or electrodes in response to temperature changes in the bath 18, whereby the bath may be maintained at a predetermined temperature level, as will hereinafter be described.

Referring now in detail to the construction of the temperature control device 10, as seen in FIGURE 2, the device 10 comprises an elongated cylindrical protection tube or housing 22 which defines a central annular cavity 24 that extends concentrically within the housing 22 and is formed with a threaded upper end section 26. The housing 22 is preferably constructed of a graphite or similar carbonaceous material which exhibits desirable heat transmitting characteristics. It will be noted that such a construction is superior to a metallic housing by irtue of the fact that the graphite will not decompose t the elevated temperature conditions of the bath 18 uch as certain metallic housings would. The housing 22 s supported within the bath reservoir 16 by means of an longated tubular support conduit 28 which has an externally threaded lower end portion 30 that is threadably ngaged with the internally threaded portion 26 of the avity 24. The conduit 28 is adapted to support the temperature control device 10 at a position within the reservoir 16 such that a major portion of the housing 22 is ubmerged below the bath line or upper surface of the molten bath 18, the conduit 28 preferably being constructed of Inconel or an equivalent strong, lightweight and corrosion-resistant material such as nickel or Hastelloy-C.

The upper end of the housing 22 and lower end of the support conduit 28 are covered with a layer of a glasslike or ceramic material, herein designated by the numeral 32, which functions to prevent the heat emanating from the bath 18 from oxidizing or burning the upper end of the housing 22, the material 32 also preventing the corrosive atmosphere above the bath 18 from attacking or corroding the lower end of the support conduit 28. The material 32 preferably comprises Boron oxide ($B_2O_3$) due to the fact that this material becomes slightly viscous at the elevated temperatures at which the furnace 12 is designed to operate, i.e., 1100–1150° F., the material 32 thereby forming a gas-tight fillet around the juncture of the lower end portion 30 of the support conduit 28 and the threaded upper end 26 of the cavity 24, as best seen at 34 in FIGURE 2, to prevent the aforesaid corrosive gases above the bath 18 from penetrating between and attacking the lower end portion 30 of the conduit 28 and/or the upper end of the housing 22. Although the lower edge of the protective material 32 is illustrated as being disposed slightly below the bath line or surface of the molten bath 18, this construction is not essential for protection of the housing 22 since the capillary action of the molten bath 18 will deposit a protective coating of the bath material around the outer periphery of the portion of the housing 22 directly above the bath line; hence, the lower edge of the material 32 may be located at or somewhat above the surface of the bath 18.

Extending through the conduit 28 are four wire conductors 36, 38, 40 and 42, the lower ends of these conductors also extending through four spaced parallel apertures, generally designated 44, which are formed within each of a plurality of ceramic insulating elements, generally designated by the numeral 46, that are vertically aligned and adjacently oriented within the cavity 24 of the housing 22. The conductors 38 and 40 are preferably constructed of Chromel and Alumel, respectively, and have their upper ends connected to the on-off control system (not shown) which controls energization and deenergization of the means for heating the furnace 12, i.e., heating coil, electrodes or the like. The opposite ends of the conductors 38 and 40 comprise lower sections 48 and 50 which extend through suitable openings in another insulating element 51 which is spaced slightly below the lowermost element 46, the sections 48 and 50 being welded together directly adjacent the inner surface of the bottom of the housing 22 as seen at 52 in FIGURE 2, whereby the conductors 38 and 40 provide a temperature sensing thermocouple mechanism of a type well known in the art. At such time as the temperature of the bath 18 adjacent the housing 22 drops below a predetermined level, the thermocouple mechanism will generate a signal that will be transmitted to the aforedescribed control system, whereby the heating means for the furnace 12 will be automatically energized. When the bath 18 has been heated sufficiently, the thermocouple mechanism will again signal the aforesaid control system, resulting in the aforesaid heating means being deenergized.

The conductors 36 and 42 are preferably constructed of stainless steel and terminate at their lower ends interjacent the top of the insulating element 51 and the lower side of the lowermost element 46 and are adapted to provide means for detecting the presence of any leak openings, such as cracks or the like, that may exist within the housing 22. More particularly, the lower ends of the conductors 36 and 42, which have each been provided with a weld "button" 53 or have a reverse bent section formed thereon to prevent the conductors 36 and 42 from being inadvertently pulled upwardly through the insulators 46, are adapted to detect the presence of any of the molten bath 18 which may have leaked into the cavity 24 through a crack or similar type opening in the housing 22. The upper ends of the conductors 36 and 42 are respectively connected to a source of electric current and to a suitable alarm mechanism (not shown) such as a light, buzzer or bell in a manner such that when electric current is transmitted from the conductor 36 to the conductor 42, the alarm mechanism will be energized. At such time as a leak occurs in the housing 22, the molten bath 18 which, in the instant application most likely comprises aluminum fluxing salt, will penetrate into the interior of the housing 22 and accumulate at the lower end of the cavity 24. Under normal operating conditions, this accumulation of caustic or corrosive molten salt would attack and render the thermocouple mechanism 52 inoperative in a relatively short period of time and without giving any warning of the defect in the housing 22 until such time as the thermocouple mechanism 52 does, in fact, become inoperative. However, by virtue of the provision of the conductors 36 and 42, when the molten salt which has leaked into the cavity 24 comes in contact with the lower ends of the conductors 36 and 42, the electric circuit between these conductors will be completed due to the fact that the molten salt is an electrically conductive fluid, hence the alarm mechanism will be automatically energized. Accordingly, the furnace operator will be given notice of the presence of the leak or the like in the housing 22 so that appropriate replacement of the housing 22 may be made before the thermocouple mechanism 52 is rendered inoperative due to corrosive attack by the molten salt that has leaked into the housing 22.

The temperature control device 10 of the present invention is adapted to find particularly useful application in association with electrically heated furnaces of the type which contain molten baths which are in themselves somewhat corrosive or caustic and from which relatively corrosive gaseous substances may emanate. More specifically and as hereinbefore stated, the temperature control device 10 is adapted to be associated with aluminum brazing furnaces containing molten aluminum fluxing salt which makes the bath 18 and also the atmosphere directly adjacent thereto highly corrosive. In such an application, most metallic enclosures which might be used to contain the thermocouple mechanism 52 would be rapidly attacked by the corrosive environment of the furnace 12; however, the graphite housing 22 readily resists any such corrosive attack and thus effectively protects the thermocouple mechanism 52 enclosed therewithin.

In operation, the temperature control device 10 is supported within the bath reservoir 16 in a position such that a major portion of the housing 22 is submerged below the surface of the molten bath 18, the device 10 preferably being located as far away as possible from the heating means, i.e., heating coil, electrodes or the like, so that the device 10 will sense the temperature of the portion of the bath which, under normal operating conditions, will be at the lowest level. Accordingly, the thermocouple mechanism 52 will signal the control mechanism to energize the aforesaid heating means when the portion of the bath which is at the lowest temperature drops below a predetermined level; hence, the minimum temperature of the entire bath 18 will always be at least equal to the said predetermined level. In the event that a leak occurs in the temperature sensing device 10, for example, a crack or similar opening in the housing 22, a portion of the molten bath will penetrate into the interior of the cavity 24 and accumulate at the lower end thereof. When the quantity of the bath fluid accumulates to a position where the lower ends of the conductor 36 and 42 are in contact therewith, an electrical current will be transmitted between the conductors 36 and 42, resulting in energization of the aforedescribed alarm system to give notice of the existence of the leak.

It will be seen from the foregoing description that the present invention provides a novel temperature control device of an extremely simple design and which may therefore be easily assembled and economically manufactured. Furthermore, by virtue of the fact that the temperature control device 10 of the present invention is constructed of corrosive and heat resistant materials, the device may be operatively associated with furnaces containing corrosive or caustic molten baths. Also, the temperature control device 10 of the present invention may be easily installed and assumes very little space when operatively mounted on an electric furnace or the like, thus the device 10 will not interfere to any extent with replenishing the molten bath or with transporting work stock to and from the bath.

Although particular reference has been made herein to use of the temperature control device 10 of the present invention as applied to aluminum brazing furnaces, it will be noted that the present invention is not intended to be limited to this sole application since it will be apparent that the principles of the present invention described herein may be readily incorporated in a temperature control device for use in virtually any type of temperature sensing application. Accordingly, it is to be understood that the claims appended hereto which are not specifically limited to aluminum brazing furnaces or molten salt baths are to be construed to encompass a control device for virtually any type of temperature sensing application.

While it will be apparent that the exemplary embodiment herein illustrated is well calculated to fulfill the objects above stated, it will be appreciated that the temperature control device 10 of the present invention is susceptible to modification, variation and change without departing from the proper scope or fair meaning of the subjoined claims.

What is claimed is:
1. In a temperature control device for an aluminum brazing furnace comprising a bath of molten salt,
a hollow elongated graphite housing having a central cavity formed therein,
a hollow support member threadably secured within the upper end of said cavity and adapted to support said housing in a position partially submerged in the bath,
said support member being constructed of a corrosion-resistant metallic material,
a glass-like material surrounding the juncture of said support member and said housing and adapted to be transformed to a semi-viscous state in the presence of the molten salt bath of the furnace, whereby to provide a substantially fluid-tight seal around said juncture,
a plurality of insulating elements arranged within said cavity and defining four spaced parallel and aligned bores, a thermocouple sensing element adjacent the lower end of said housing,
first and second wire conductors extending through two of said bores and being connected at their lower ends to said sensing element,
third and fourth conductors extending through two of said bores and terminating at their lower ends directly above the lowermost of said insulating elements so as to be spaced a predetermined distance above said sensing element,
said third and fourth conductors being connected to a source of electric current and to means for indicating the flow of current through said third and fourth conductors, whereby electric current will be transmitted between said third and fourth conductors when a predetermined quantity of molten salt from the bath accumulates within the lower end of said cavity.

2. The invention as set forth in claim 1 wherein said conductors are fabricated of a Chromel and Alumel.

3. The invention as set forth in claim 1 wherein said support member is fabricated of Inconel.

4. The invention as set forth in claim 1 wherein said glass-like material comprises boron-oxide ($B_2O_3$).

References Cited

UNITED STATES PATENTS

| | | | |
|---|---|---|---|
| 2,019,695 | 11/1935 | Ross | 73—359 |
| 2,446,760 | 8/1948 | Hampson | 340—242 |
| 2,519,941 | 8/1950 | Tama | 73—359 |
| 2,660,061 | 11/1953 | Lewis | 73—359 |
| 2,793,815 | 5/1957 | Pfaffhausen | 340—242 |
| 2,802,894 | 8/1957 | Schneider | 136—232 |
| 2,844,637 | 7/1958 | Borel | 136—232 |

FOREIGN PATENTS

| | | |
|---|---|---|
| 484,071 | 10/1929 | Germany. |
| 543,597 | 3/1942 | Great Britain. |
| 547,840 | 9/1942 | Great Britain. |
| 160,873 | 8/1963 | Russia. |

OTHER REFERENCES

Freeman, R. W. S.; Canadian Metals and Metallurgical Industries, December 1944, pages 23–25 relied on.

Klines, E. M.: Metals and Alloys, February 1945, pages 401–403 relied on.

WINSTON A. DOUGLAS, *Primary Examiner.*

MELVYN J. ANDREWS, *Assistant Examiner.*

U.S. Cl. X.R.

73—359; 340—242